United States Patent
Bocking et al.

(10) Patent No.: US 10,491,744 B2
(45) Date of Patent: *Nov. 26, 2019

(54) HANDHELD ELECTRONIC DEVICE INCLUDING CROSS APPLICATION USE OF PHONE RELATED INPUTS, AND ASSOCIATED METHOD

(71) Applicant: BlackBerry Limited, Waterloo (CA)

(72) Inventors: Andrew Douglas Bocking, Conestogo (CA); Raymond Paul Vander Veen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,961

(22) Filed: Oct. 6, 2015

(65) Prior Publication Data

US 2016/0028879 A1    Jan. 28, 2016

Related U.S. Application Data

(63) Continuation of application No. 13/300,106, filed on Nov. 18, 2011, now Pat. No. 9,160,839, and a
(Continued)

(51) Int. Cl.
*H04M 1/00* (2006.01)
*H04M 1/725* (2006.01)
(Continued)

(52) U.S. Cl.
CPC ...... *H04M 1/72583* (2013.01); *G06F 3/0482* (2013.01); *G06F 3/04842* (2013.01);
(Continued)

(58) Field of Classification Search
USPC ......... 379/93.34, 90.01, 93.23, 93.28, 93.02, 379/93.08, 201.01, 201.02, 219, 220.01,
(Continued)

(56) References Cited

U.S. PATENT DOCUMENTS 5,708,804 A    1/1998  Goodwin et al.
5,815,142 A    9/1998  Allard et al.
(Continued)

FOREIGN PATENT DOCUMENTS

EP    1104151    5/2001

OTHER PUBLICATIONS

Sony, "Mobile Telephone User Guide"; XP-002310503; pp. 1-82.
(Continued)

*Primary Examiner* — Charles N Appiah
*Assistant Examiner* — Alexander J Yi
(74) *Attorney, Agent, or Firm* — Jeffrey N. Giunta; Fleit Intellectual Property Law (57) ABSTRACT

A method and system are disclosed. An active application, which is an application other than a phone application and an address book application, displays information. A selection is received of an information portion from within the displayed information, the information portion being other than a telephone number. Based on determining the pressing of the call-initiation key while the information portion is selected, and based on accessing contact information stored within the address book application without opening or displaying the address book application, a detected contact entry stored by the address book application is determined where the detected contact entry includes the information portion. A target telephone number associated with the detected contact entry is determined based on determining the detected contact entry. A call to the target telephone number is placed.

17 Claims, 5 Drawing Sheets

Related U.S. Application Data continuation of application No. 10/939,622, filed on Sep. 13, 2004, now Pat. No. 8,086,274.

(51) Int. Cl.
| | |
|---|---|
| *G06F 3/0482* | (2013.01) |
| *G06F 3/0484* | (2013.01) |
| *H04M 1/2745* | (2006.01) |

(52) U.S. Cl.
CPC . *H04M 1/27455* (2013.01); *H04M 1/274508* (2013.01); *H04M 1/7258* (2013.01); *H04M 1/72547* (2013.01); *H04M 1/2745* (2013.01); *H04M 2001/274541* (2013.01)

(58) Field of Classification Search
USPC ... 379/222, 223, 88.13, 88.14, 88.17, 88.24, 379/88.25, 93.24, 218.01, 201.05, 356.01, 379/201.03, 201.04, 218.02, 353, 355.07, 379/352
See application file for complete search history.

(56) References Cited

U.S. PATENT DOCUMENTS

| | | | |
|---|---|---|---|
| 5,873,099 | A | 2/1999 | Hogan et al. |
| 6,766,017 | B1 | 7/2004 | Yang |
| 6,771,980 | B2 | 8/2004 | Moon |
| 6,781,575 | B1 | 8/2004 | Hawkins et al. |
| 6,980,641 | B1 | 12/2005 | Stanford et al. |
| 7,167,728 | B1 | 1/2007 | Wagner et al. |
| 7,221,748 | B1 | 5/2007 | Moore et al. |
| 7,382,871 | B1 * | 6/2008 | Ure ............ H04L 29/1216 379/201.05 |
| 8,086,274 | B2 | 12/2011 | Bocking et al. |
| 9,160,839 | B2 | 10/2015 | Bocking et al. |
| 2002/0065820 | A1 | 5/2002 | Enns |
| 2002/0128036 | A1 | 9/2002 | Yach et al. |
| 2005/0050032 | A1 | 3/2005 | Lee |
| 2005/0266839 | A1 | 12/2005 | Paul et al. |
| 2006/0058063 | A1 | 3/2006 | Bocking et al. |
| 2012/0064876 | A1 | 3/2012 | Bocking et al. |

OTHER PUBLICATIONS

Siemens AG 2002, User's Manual for Model S55 Mobile Phone.
Siemens AG 2002, User's Manual for Model S55 Mobile Phone; English version.
Office Action dated May 23, 2006, received for U.S. Appl. No. 10/939,622.
Office Action dated Sep. 13, 2006, received for U.S. Appl. No. 10/939,622.
Office Action dated Jun. 13, 2007, received for U.S. Appl. No. 10/939,622.
Office Action dated Sep. 24, 2007, received for U.S. Appl. No. 10/939,622.
Office Action dated Apr. 20, 2012, in Indian Patent Application No. 2415/DEL/2005.
Office Action dated Jul. 5, 2012, received for U.S. Appl. No. 13/300,106.
Office Action dated Feb. 14, 2013, received for U.S. Appl. No. 13/300,106.
Office Action dated Apr. 25, 2013, received for U.S. Appl. No. 13/300,106.
Office Action dated Nov. 7, 2013, received for U.S. Appl. No. 13/300,106.
Office Action dated Mar. 27, 2014, received for U.S. Appl. No. 13/300,106.
Office Action dated Jan. 5, 2015, received for U.S. Appl. No. 13/300,106.

* cited by examiner

HANDHELD ELECTRONIC DEVICE INCLUDING CROSS APPLICATION USE OF PHONE RELATED INPUTS, AND ASSOCIATED METHOD

BACKGROUND OF THE INVENTION

Field of the Invention

The invention relates generally to handheld electronic devices and, more particularly, to a handheld electronic device that utilizes phone related inputs across multiple applications executed by the device. The invention also relates to a method of utilizing phone related inputs across multiple applications executed by the device.

Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among these applications.

Many devices that provide telephone functionality include dedicated <SEND> and <END> keys, or the like, for enabling a user to initiate a new call, answer an incoming call, or terminate a call that is in progress. The <SEND> key, however, is typically only able to initiate a call after the user has either: (i) entered or initiated the device's telephone application and entered a phone number or selected a stored phone number (such as in a call log), or (ii) entered or initiated the device's address book application and selected a stored phone number. In such a device, the <SEND> and <END> keys are not able to be used from other active applications to initiate telephone related activity. However, with more and more handheld electronic devices including multiple applications, it would be convenient and useful for a user to be able to quickly and easily initiate telephone related activity from applications other than the telephone and address book applications, particularly those applications that may include contact related information for an individual that the user desires to call. For example, a user may receive an email, SMS message or MMS message from an individual and may, while viewing the email, SMS message or MMS message in the associated application, desire place a call to that individual. With known handheld electronic devices, the individual would need to leave the current application (e.g., email, SMS or MMS), activate the telephone application, either enter that individual's phone number or access that individual's phone number from the address book application, and activate or depress the <SEND> key. These steps, while ultimately achieving the purpose of placing the desired call, are inconvenient and time consuming. Thus, there is a need for a handheld electronic device that will enable a user to utilize phone related inputs, such as the activation (e.g., depression) of the <SEND> key, to execute phone related functions while another application is active and in use.

BRIEF DESCRIPTION OF THE DRAWINGS

A full understanding of the invention can be gained from the following Description of the Preferred Embodiment when read in conjunction with the accompanying drawings in which.

DESCRIPTION OF THE PREFERRED EMBODIMENT

Figure 1:
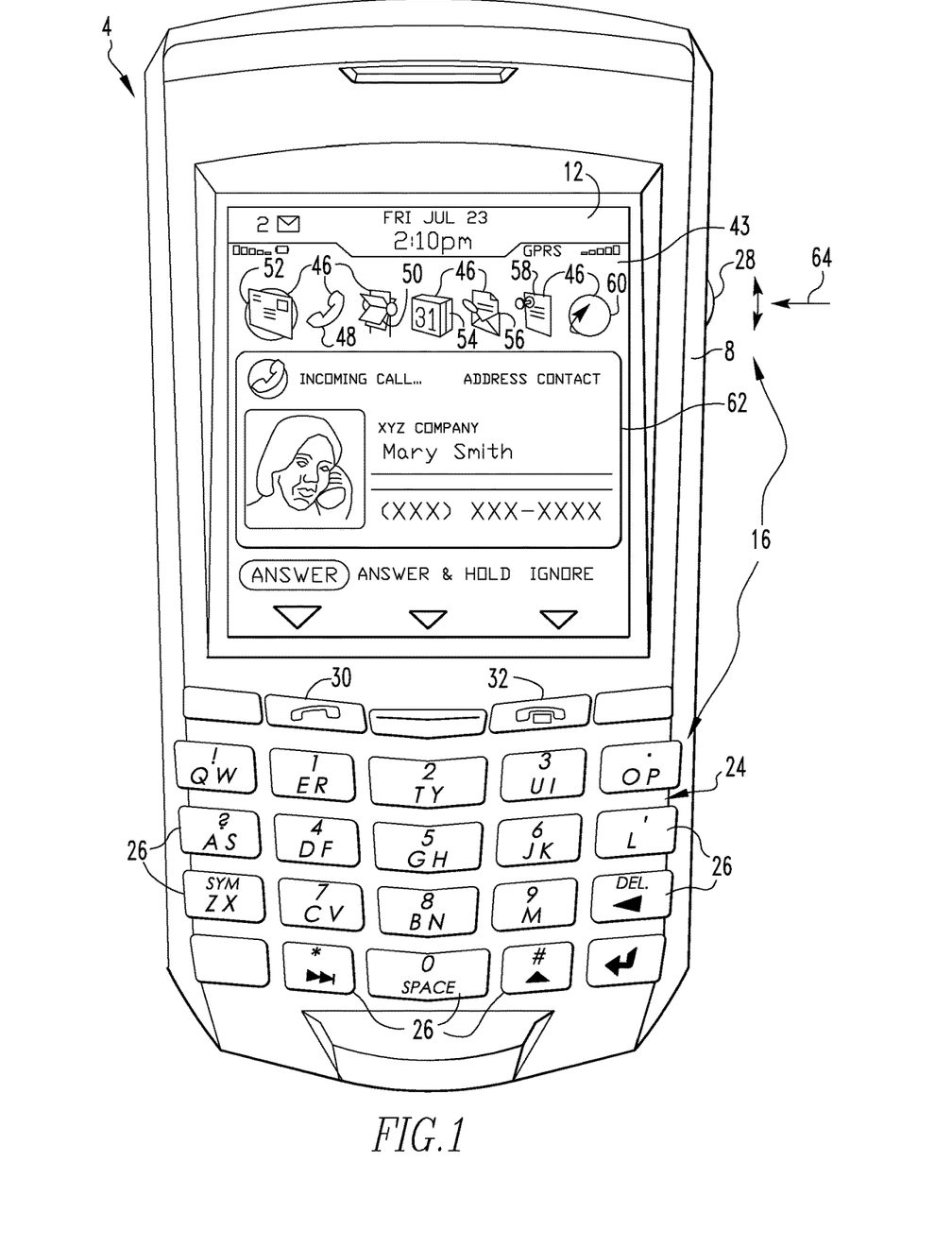
FIG. 1 is a top plan view of an improved handheld electronic device in accordance with the invention.
Figure 2:
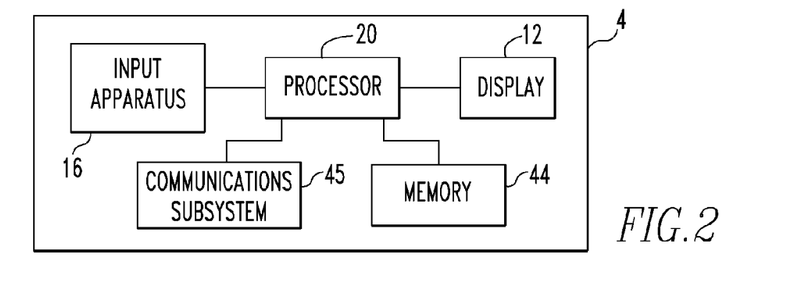
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (µP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein. The handheld electronic device 4 is of a type that includes a cellular telephone capability and, as will be described in greater detail below, allows for cross application use of phone related inputs to initiate phone functions. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. Keys 26 include a <SEND> key 30 and an <END> key 32, the functions of which will be described in greater detail below. The keys 30, 32 may include suitable text and/or graphics (as shown) disposed (e.g., printed) thereon. As used herein, the expression "function" and variations thereof can refer to any type of process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobiltex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. Together, processor 20, memory 44 and communications subsystem 45 may, along with other components (having various types of functionality), be referred to as a processing unit.

In FIG. 1, the display 12 is depicted as displaying a home screen 43 that includes a number of applications depicted as discrete icons 46, including an icon representing a phone application 48, an address book application 50 for storing information for a plurality of contacts, a messaging application 52 which includes email, SMS and MMS applications, a calendar application 54, a memo application 56 for enabling a user to create documents and to record notes, lists and the like, a task application 58 for enabling a user to create and manage lists of tasks, and a browser application 60 for accessing and navigating the Internet. As is known in the art, address book application 50 allows the user of handheld electronic device 4 to store contact related information for a number of contacts, including, among other things, the contact's name, phone number, home and office addresses, email address, and other information that may be used to contact the person.

In FIG. 1, the home screen 43 is currently active and would constitute a portion of an application. In addition, display 12 shown in FIG. 1 shows a pop-up box 62 that indicates that there is currently a phone call coming into handheld electronic device 4. Pop-up box 62 provides certain information relating to the incoming call, including, for example, the caller's phone number and identifying information if the caller and phone number are stored as a contact by address book application 50 of handheld electronic device 4. Other applications, such as phone application 48, address book application 50, messaging application 52, calendar application 54, memo application 56, task application 58 or browser application 60, can be initiated from the home screen 43 by providing an input through the input apparatus 16, such as by rotating the thumbwheel 28 and providing a selection input by translating the thumbwheel 28 in the direction indicated by the arrow 64 in FIG. 1.

According to the invention, certain predetermined functions of handheld electronic device 4 are initiated when either <SEND> key 30 or <END> key 32 is pressed by a user depending on the current use state of handheld electronic device 4. As used herein, the term use state refers to the application and/or portion thereof that is currently active and in use on handheld electronic device 4 and the information, if any, that is selected or highlighted by the user using input apparatus 16. Table 1 below shows a number of use states of handheld electronic device 4 and the corresponding function that will be implemented by handheld electronic device 4 upon activation (e.g., depression) of <SEND> key 30 in each use state according to one embodiment of the invention. It will be appreciated that Table 1 is not meant to be exhaustive, and instead other use states and corresponding functions are possible without departing from the scope of the invention.

TABLE 1

| USE STATE | FUNCTION INITATED BY <SEND> KEY |
|---|---|
| 1. Idle, meaning a state or no user action for a period of time | Make phone application the currently active application; if <SEND> key is depressed again without any other actions, the last number dialed will immediately be called |
| 2. Phone number hyperlink selected in an application other than phone application, such as email, browser, SMS or MMS | Immediately call the selected phone number |
| 3. In the phone application with a "hot list" (list of most frequently called names/numbers) or call log item selected | Immediately call the phone number associated with the selected hot list or call log item |
| 4. In phone application with a number entered in "Enter Number" field | Immediately call the entered number |
| 5. In the address book application showing a list of contacts with a listed contact selected | Immediately call the phone number associated with the selected contact if only one phone number is stored for that contact; if more than one phone number is stored for that contact, provide a prompt to the user to select a phone number to call |
| 6. In the address book application with a specific contact's information open and | Immediately call the phone number associated with the opened contact if only |

TABLE 1-continued

| USE STATE | FUNCTION INITATED BY <SEND> KEY |
|---|---|
| displayed without a phone number field being selected | one phone number is stored for that contact; if more than one phone number is stored for that contact, provide a prompt to the user to select a phone number to call |
| 7. In the email, SMS, or MMS application with contact related information such as a name or email address that appears in the header or body of an email, SMS message or MMS message selected, or in an application such as the calendar or task application with contact related information selected, and the selected information is also stored by the address book application in connection with a contact | Immediately call the phone number from the address book application that is associated with the selected name if only one phone number is stored in the address book application for the corresponding contact; if more than one phone number is stored for that contact, provide a prompt to the user to select a phone number to call |
| 8. In the address book application with a specific contact's information open and displayed and with a particular phone number field being selected | Immediately call the selected phone number |
| 9. In any application with a phone call incoming | Answer the incoming phone call |
| 10. In any application and connected to a phone call | Make the phone application the currently active application (if not so already), activate the conference call function, and await entry of a phone number to be conferenced in; after number is entered and <SEND> key is depressed again, the first call is placed on hold and the second phone number is dialed; the first phone number is conferenced in when the <SEND> key is depressed yet again |

Table 2 below shows a number of use states of handheld electronic device 4 and the corresponding function that will be implemented by handheld electronic device 4 upon depression of <END> key 32 in each state according to one embodiment of the invention. As was the case with Table 1, it will be appreciated that Table 2 is not meant to be exhaustive, and instead other use states and corresponding functions are possible without departing from the scope of the invention.

TABLE 2

| USE STATE | FUNCTION INITATE BY <END> KEY |
|---|---|
| 1. On a current active phone call in the the phone application ("active call" screen being displayed) | End the call and return the user to the state/application the device was in immediately prior to the call being made or received |
| 2. On a current, active phone call but an application other than the phone application is the currently active application | End the current call and (i) play an audible hang-up tone, and (ii) flash the active call screen momentarily with a "disconnected" message; return user to the state/application the device was in immediately before the <END> key was depressed |
| 3. Incoming phone call in any application | Ignore the incoming call |
| 4. Idle, meaning a state or no user action for a period of time | Return user to the home screen |

Figure 3A:
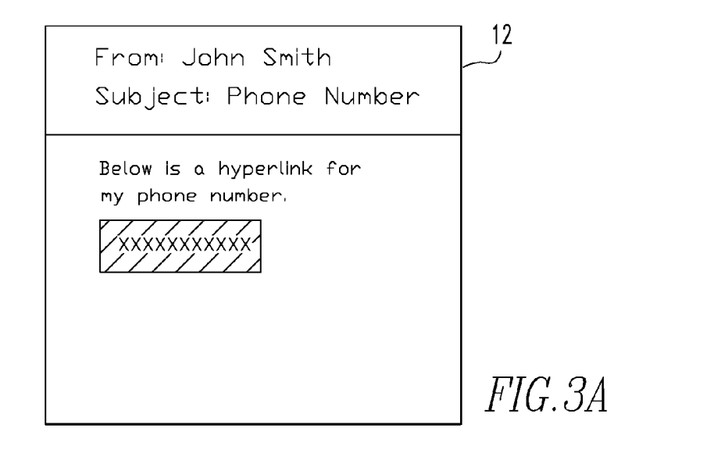
FIGS. 3A, 3B, 4A, 4B, 5A and 5B are exemplary views of a portion of the display of the handheld electronic device of FIGS. 1 and 2 according to the invention.
Figure 3B:
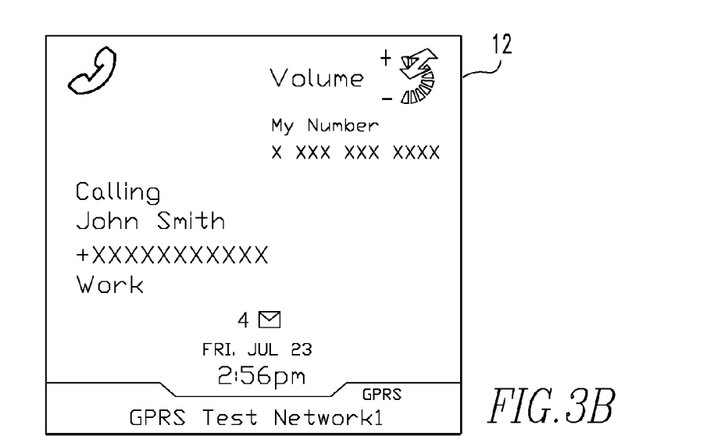
Figure 4A:
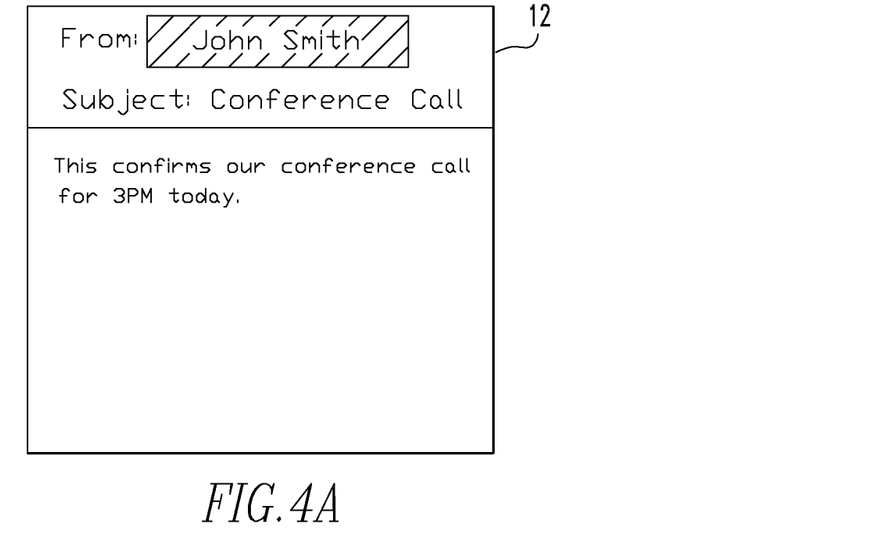
Figure 4B:
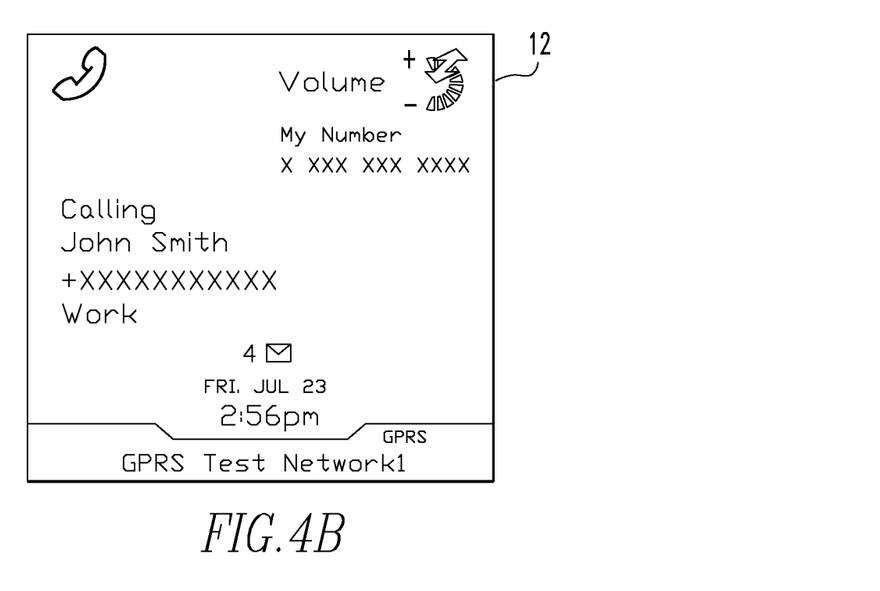
Figure 5A:
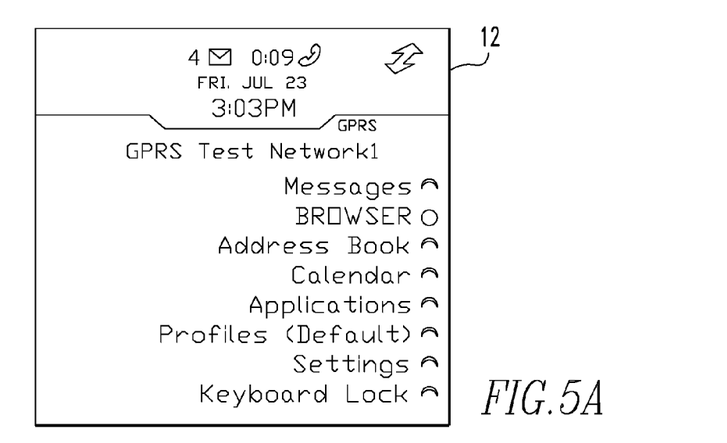
Figure 5B:
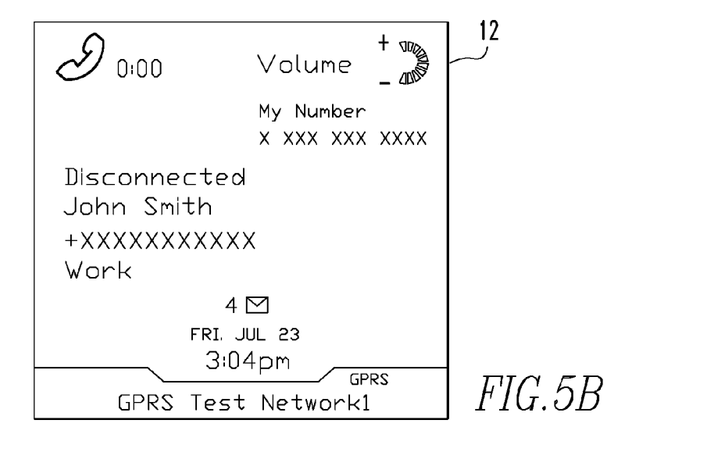

As seen in Tables 1 and 2, a number of use states and corresponding functions involve execution across two or more applications of handheld electronic device 4. For example, in use case number 2 of Table 1, handheld electronic device 4 begins in, for example, the email, browser, SMS or MMS application with a phone number hyperlink selected, and activates the phone application to place a call to the phone number of the hyperlink based simply on the depression of <SEND> key 30. FIGS. 3A and 3B are exemplary views of a portion of display 12 before and after <SEND> key 30 is depressed in use state number 2 of Table 1. Similarly, in use state number 7 of Table 1, handheld electronic device 4 begins in the email, SMS or MMS application with a name highlighted, utilizes the address book application to find a corresponding phone number, and activates the phone application to place a call to the corresponding number, all based simply on the depression of <SEND> key 30. FIGS. 4A and 4B are exemplary views of a portion of display 12 before and after <SEND> key 30 is depressed in use state number 7 of Table 1. As will be appreciated, the selected portion in FIG. 4A (cross hatched) may be another type of contact related information, such as an email address (e.g., jsmith@xyzcompany.com). Also similar is use case number 2 of Table 2, in which a user is on a current telephone call but is, at the same time, utilizing an application other than the phone application, such as the email, browser, SMS or MMS application. In this case, when <END> key 32 is depressed, handheld electronic device 4 activates the phone application to end the call, plays an audible hang-up tone, and momentarily flashes the active call screen with a "disconnected" message. FIGS. 5A and 5B are exemplary views of a portion of display 12 before and after <END> key 32 is depressed in use case 2 of Table 2.

Figure 6:
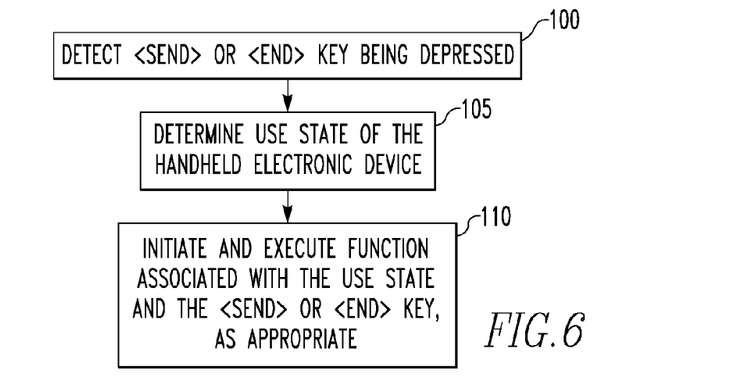
FIG. 6 is a flowchart depicting a routine executed by the processor of the handheld electronic device of FIGS. 1 and 2 for initiating functions based on phone-related inputs according to the invention.

FIG. 6 is a flow chart of a routine for initiating various phone-related functions of handheld electronic device 4 based on phone-related inputs, e.g., inputs from <SEND> key 30 and <END> key 32, according to the invention. As seen in FIG. 6, at 100, <SEND> key 30 or <END> key 32 is depressed by the user and such depression is detected by processor 20. Next, at 105, processor 20 determines the current use state of handheld electronic device 4. Then, at 110, once the current use state is established, processor 20 initiates and executes the function or functions associated with the established use state of handheld electronic device 4 and either <SEND> key 30 or <END> key 32, whichever was depressed at 100. As will be appreciated by those of skill in the art, memory 44 may store a table or the like that associates each use state with the predetermined function or functions that are executed upon depression of <SEND> key 30 or <SEND> key 32 in that use state.

Figure 7:
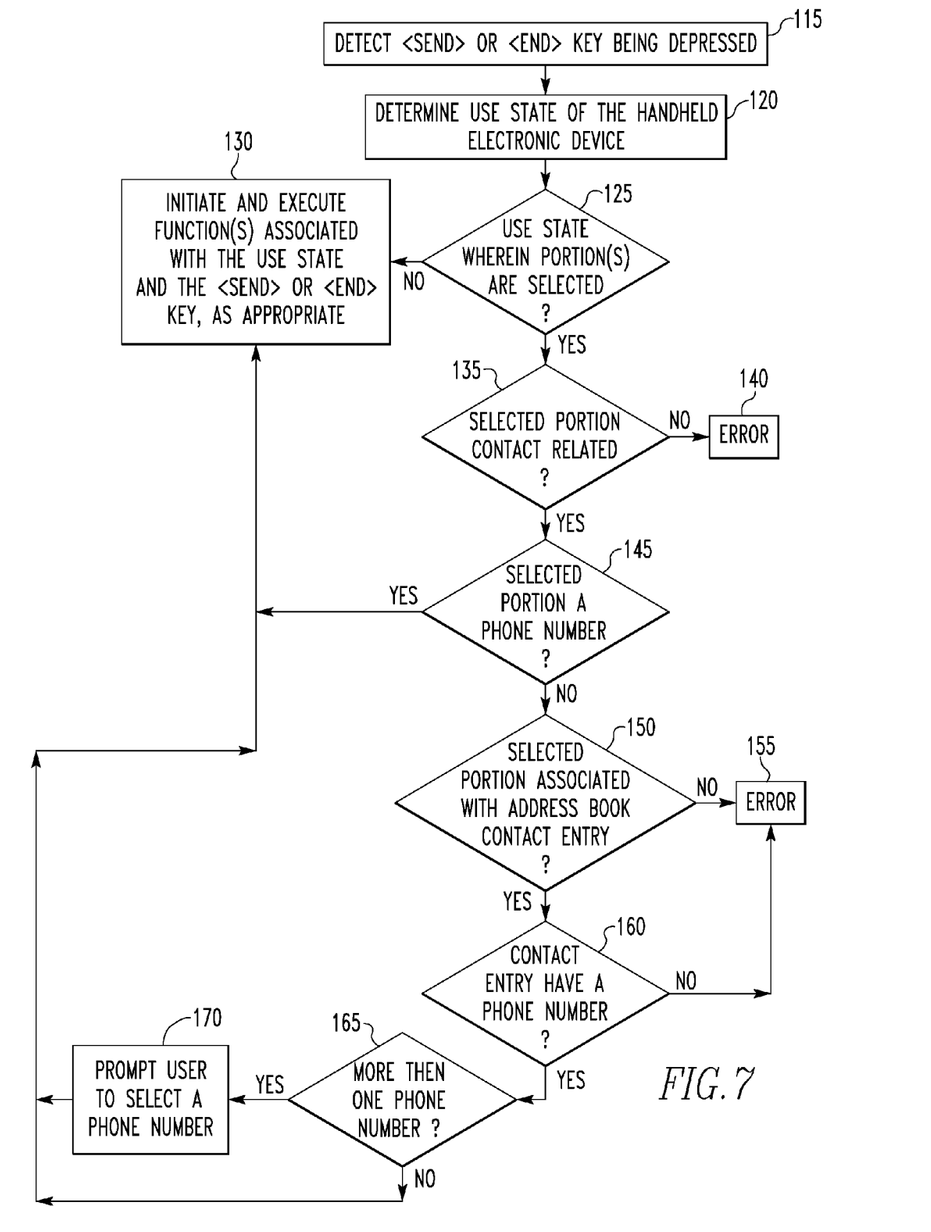
FIG. 7 is a flow chart depicting a particular embodiment of the routine shown in FIG. 6. Similar numerals refer to similar parts throughout the specification.

FIG. 7 is a flow chart of a particular implementation of the routine shown in FIG. 6 that implements the use states of Tables 1 and 2. In this embodiment, the information in Tables 1 and 2 is stored in memory 44. At 115, <SEND> key 30 or <END> key 32 is depressed and such depression is detected by processor 20. Next, at 120, processor 20 determines the current use state of handheld electronic device 4. At 125, a determination is made as to whether the established use state is a use state wherein one or more portions of information displayed on display 12 are selected by the user using input apparatus 16. If the answer is no, then at 130, processor 20 initiates and executes the function or functions associated with the established use state and either <SEND> key 30 or <END> key 32, whichever was depressed. If the answer at 125 is yes, a determination is made at 135 as to whether the selected portion of information is contact related, meaning it is a phone number, an email address, a name or other contact related information appearing in, for example, a header of an email, SMS or MMS message or a portion of another application, that may also be stored by the address book application of handheld electronic device 4. If the answer at 135 is no, then, as shown at 140, an error state is determined because the selected information cannot be utilized to place a phone call or obtain information required to place a phone call according to the invention. If, however, the answer at 135 is yes, another determination is made at 145 as to whether the selected portion of information is a telephone number or telephone number hyperlink. If it is, then the routine proceeds to 130, where the phone application of handheld electronic device 4 is activated and places a phone call to the telephone number. If the selected portion of information is not a telephone number, but rather is some other type of contact related information, then at 150, a determination is made as to whether the selected portion of information is associated with a contact entry stored by the address book application of handheld electronic device 4. If not, then, at 155, an error condition is detected and the user is preferably notified that a phone call cannot be placed based on the selected information. Otherwise, at 160, a determination is made as to whether the contact entry associated with the selected portion of information includes at least one telephone number. If not, then the routine proceeds to 155. If there is at least one telephone umber, then, at 165, a determination is made as to whether there is more than one telephone number for the contact entry. If there is more than one telephone number, then, at 170, the user is prompted to select one of the numbers after which the routine proceeds to 130, where the phone application of handheld electronic device 4 is activated and places a phone call to the selected telephone number. If at 165 the answer is no, then the routine simply proceeds to 130 and the phone application of handheld electronic device 4 is activated and places a call to the telephone number.

Thus, the invention provides a handheld electronic device capable of executing multiple applications that delivers added convenience for the user by enabling the user to quickly and easily initiate telephone related functions, such as placing a telephone call, directly from applications other than the device's phone and address book applications using a dedicated phone related key.

In an example, a method includes displaying information by an active application, which is an application other than a phone application and an address book application. A selection is received of an information portion from within the displayed information, the information portion being other than a telephone number. Based on determining the pressing of the call-initiation key while the information portion is selected, and based on accessing contact information stored within the address book application without opening or displaying the address book application, a detected contact entry stored by the address book application is determined where the detected contact entry includes the information portion. A target telephone number associated with the detected contact entry is determined based on determining the detected contact entry. A call to the target telephone number is placed.

In another example, a mobile electronic device includes a memory having stored thereon an address book application, a phone application, and at least one other application, the at least one other application being an application other than the phone application and the address book application. The mobile electronic device also includes a display configured to display by an active application, displayed information on a display, the active application being an application other than the phone application and the address book application. The mobile electronic device further includes an input apparatus that when operating, receives a selection of an information portion from within the displayed information, the information portion comprising information other than a telephone number and that includes a call-initiation key that is presented independently of a display of the information portion and that has a common fixed location relative to a display presented by multiple applications. The mobile electronic device further includes a processor that, when operating, executes the applications stored on the memory, detects, while the information portion is selected, a pressing of a call-initiation key; determines, based on a detection of the pressing of the call-initiation key and based on accessing contact information stored within the address book application without opening or displaying the address book application, a detected contact entry stored by the address book application, the detected contact entry comprising the information portion, the information portion being other than a telephone number. The processor, when operating, further determines, based on determining the detected contact entry, a target telephone number associated with the detected contact entry, and places a call to the target telephone number.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method implemented by a processor of a mobile electronic device, the method comprising:
   displaying, by an active application executing on the mobile electronic device, displayed information on a display, the displayed information depicting application data stored by the active application that is independent of data used to communicate the application data to the mobile electronic device, the active application being an application presently providing a user interface on the display of the mobile electronic device for data communications with remote devices, the active application being at least one of an e-mail application, a messaging application, a memo application, a calendar application, a task application, or a browser application;
   determining, based on a pressing of a call-initiation key:
      which application within a plurality of stored applications is a currently active application; and
      whether or not there is a presently selected information portion within the displayed information of the currently active application where the presently selected information portion comprises contact related information, wherein the call-initiation key initiates a respective function within any of the plurality of stored applications that was determined to be currently active;
   determining a present use state, the present use state being determined according to:
      which application is the currently active application; and
      which type of information comprises the presently selected information portion comprising an address book entry stored by an address book application;
   determining,
      based on the present use state,
      and based on accessing contact information stored within the address book application without opening or displaying the address book application,
      a detected contact entry stored by the address book application, the detected contact entry comprising the presently selected information portion;
   determining, based on determining the detected contact entry, a target telephone number associated with the detected contact entry; and
   placing a call to the target telephone number.

2. The method of claim 1, wherein the determining the target telephone number further comprises:
   determining that the detected contact entry comprises a plurality of telephone numbers; and
   prompting, based on determining that the detected contact entry comprises a plurality of telephone number, a user to select one telephone number of the plurality of telephone numbers as the target telephone number.

3. The method of claim 1, wherein determining the detected contact entry is based on the present use state being defined by the currently active application being one of an e-mail client, an SMS application, or an MMS application.

4. The method of claim 1, wherein the call-initiation key is presented independently of a display of the presently selected information portion at a time when the presently selected information portion is selected by a user.

5. The method of claim 1, wherein the mobile electronic device comprises a display screen comprising the display, wherein the call-initiation key has a common fixed location relative to the display screen when different applications are displaying any displayed information on the display.

6. The method of claim 1, wherein the presently selected information portion comprises a contact name.

7. A non-transitory computer-readable medium having computer-readable instructions stored thereon for execution by a processor of a mobile electronic device, wherein the instructions, when executed by the processor:
   display, by an active application executing on the mobile electronic device, displayed information on a display, the displayed information depicting application data stored by the active application that is independent of data used to communicate the application data to the mobile electronic device, the active application being an application presently providing a user interface on the display for data communications with remote devices, the active application being at least one of an e-mail application, a messaging application, a memo application, a calendar application, a task application, or a browser application;
   determine, based on a pressing of a call-initiation key:
      which application within a plurality of stored applications is a currently active application; and
      whether or not there is a presently selected information portion within the displayed information of the currently active application where the presently selected information portion comprises contact related information;
   determine a present use state, the present use state being determined according to:
      which application is the currently active application; and
      which type of information comprises the presently selected information portion comprising an address book entry stored by an address book application;
   determine,
      based on the present use state,
      and based on accessing contact information stored within the address book application without opening or displaying the address book application,
      a detected contact entry stored by the address book application, the detected contact entry comprising the presently selected information portion;
   determine, based on determining the detected contact entry, a target telephone number associated with the detected contact entry; and
   place a call to the target telephone number.

8. A mobile electronic device, comprising:
   a memory having stored thereon an address book application, a phone application, and at least one other application, the at least one other application being an application other than the phone application and the address book application;
   a display screen configured to display, by an active application executing on the mobile electronic device, displayed information, the displayed information depicting application data stored by the active application that is independent of data used to communicate the application data to the mobile electronic device, the active application being an application presently providing a user interface on the display screen for data communications with remote devices, the active application being at least one of an e-mail application, a messaging application, a memo application, a calendar application, a task application, or a browser application;

an input apparatus that when operating, receives a selection of a presently selected information portion from within the displayed information of a currently active application, the presently selected information portion comprising contact related information, the input apparatus further comprising a call-initiation key that is presented independently of a display of the presently selected information portion and that has a common fixed location relative to the display screen when different applications are displaying any displayed information on the display;

a processor that, when operating:
   executes the applications stored on the memory;
   determining, based on a pressing of the call-initiation key:
      which application within a plurality of stored applications is the currently active application; and
      whether or not there is a presently selected information portion within the displayed information where the presently selected information portion comprises contact related information;
   detects, while the presently selected information portion is selected, a pressing of the call-initiation key that is present independently of the active application;
   determines a present use state, the present use state being determined according to:
      which application is the currently active application; and
      which type of information comprises the presently selected information portion comprising an address book entry;
   determines,
      based on the present use state,
      and based on accessing contact information stored within the address book application without opening or displaying the address book application,
      a detected contact entry stored by the address book application, the detected contact entry comprising the presently selected information portion;
   determines, based on determining the detected contact entry, a target telephone number associated with the detected contact entry; and
   places a call to the target telephone number.

9. The mobile electronic device of claim 8, wherein the call-initiation key comprises a <SEND> key.

10. The mobile electronic device of claim 8, wherein the call-initiation key is presented independently of a display of the presently selected information portion at a time when the presently selected information portion is selected by a user.

11. The method of claim 1, wherein the active application comprises a messaging application.

12. The method of claim 1, wherein the active application comprises a browser application.

13. The method of claim 1, wherein the active application comprises a memo application.

14. The method of claim 1, further comprising:
initiating a first function based on the present use state being a first use state, the first use state being defined by a first application being the currently active application, and
initiating a second function that is different from the first function based on the present use state being a second use state, the second use state being defined by a second application being the currently active application.

15. The method of claim 1, wherein the presently selected information portion comprises at least one of a name, an e-mail address, a home address, or an office address.

16. The method of claim 1, wherein the call-initiation key does not indicate any contact within the address book application.

17. The method of claim 16, wherein the call-initiation key initiates a respective function within any of the plurality of stored applications that was determined to be currently active.

* * * * *